Aug. 21, 1956 E. S. GANDRUD 2,759,637
APPARATUS FOR DISTRIBUTING GRANULAR MATERIAL
Filed June 23, 1954 3 Sheets-Sheet 3
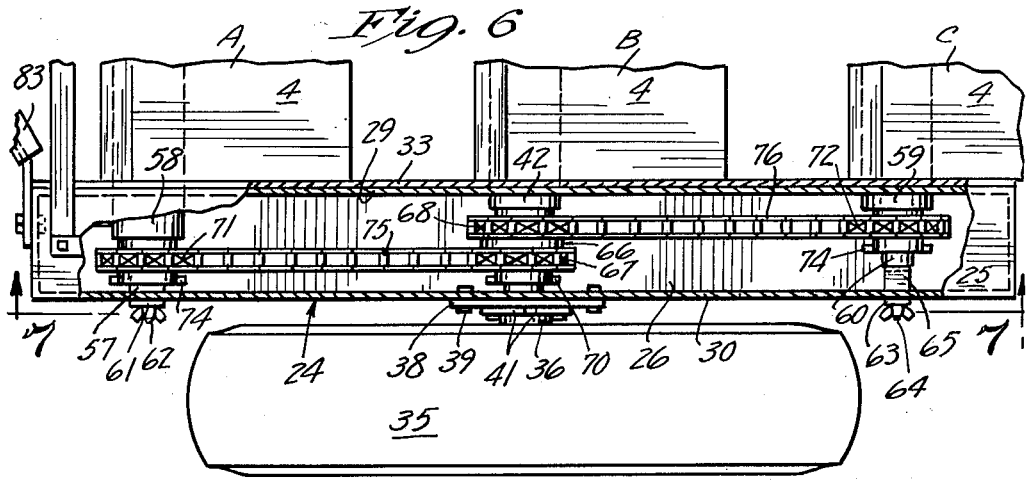
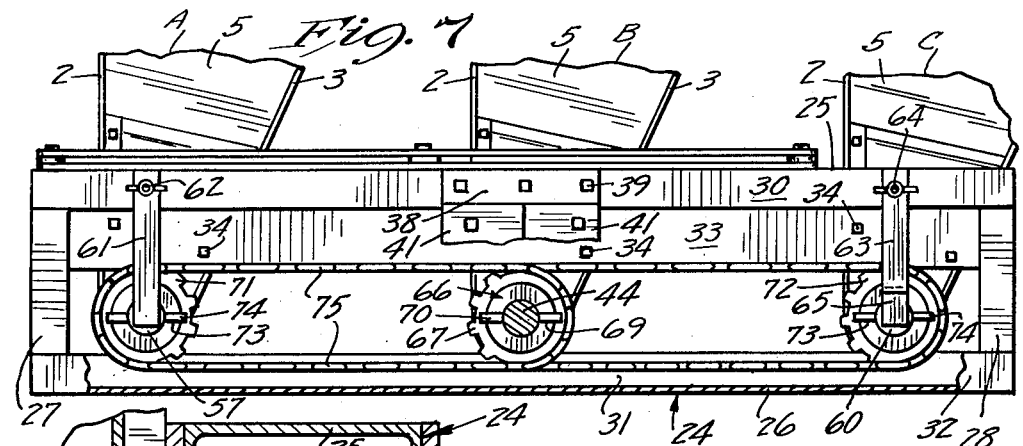
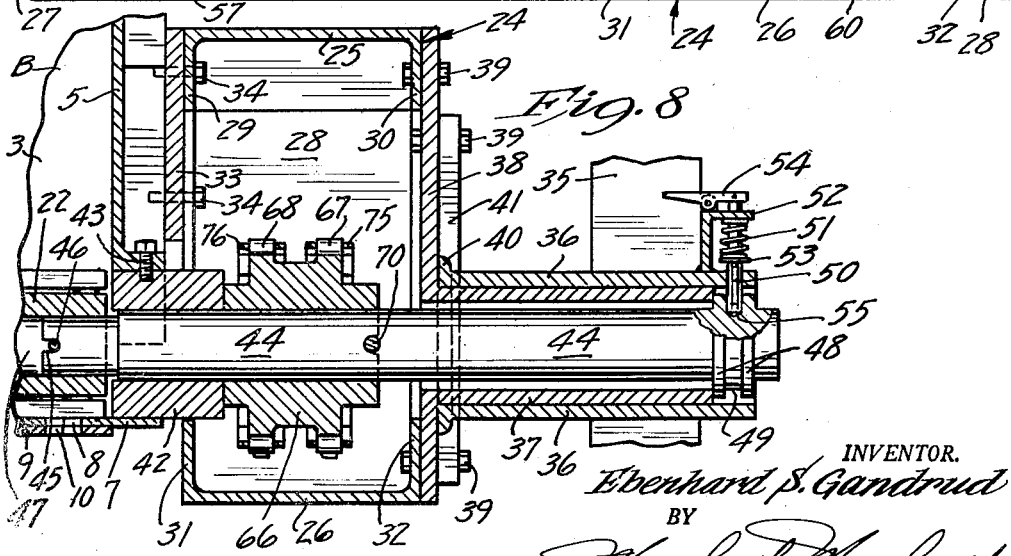

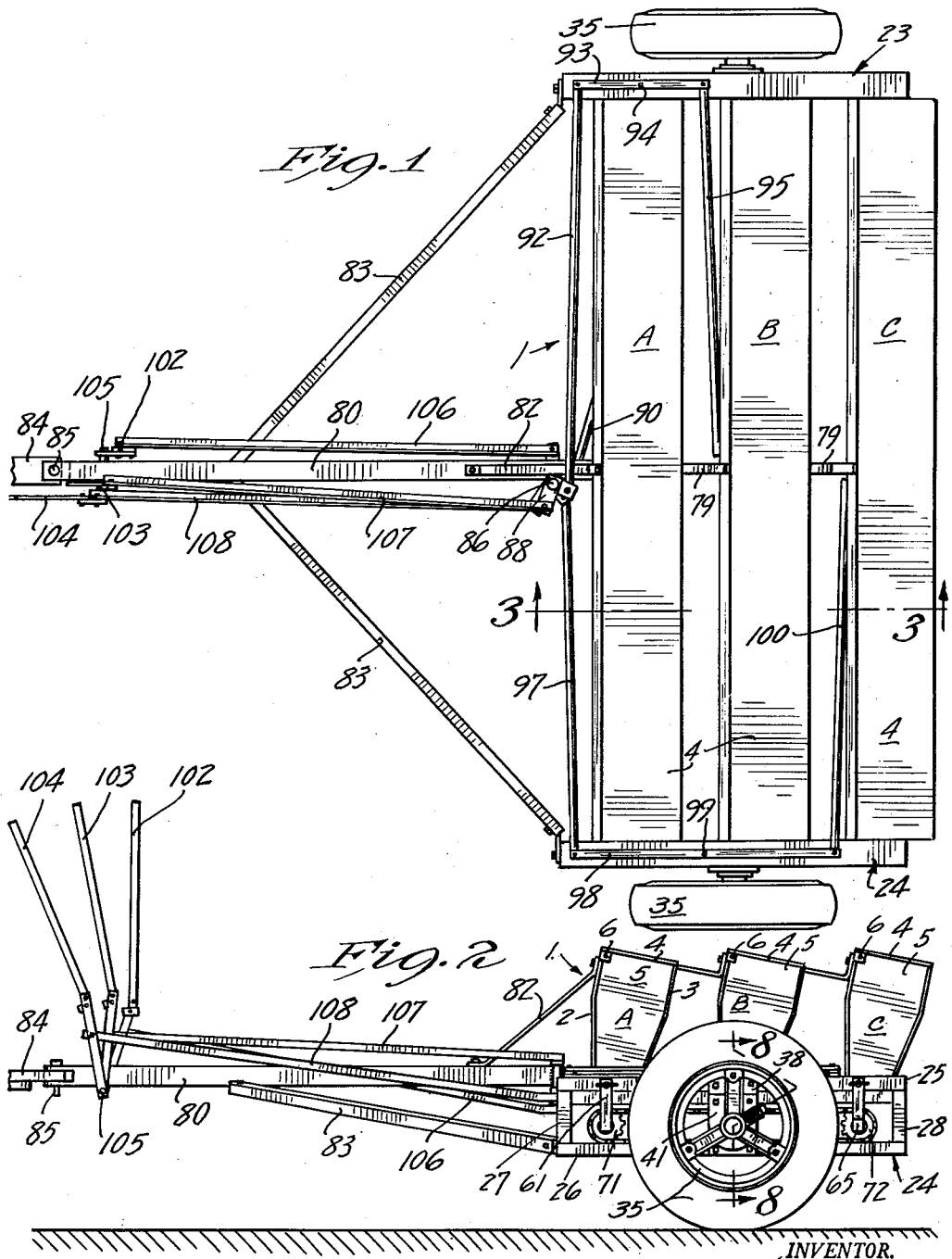

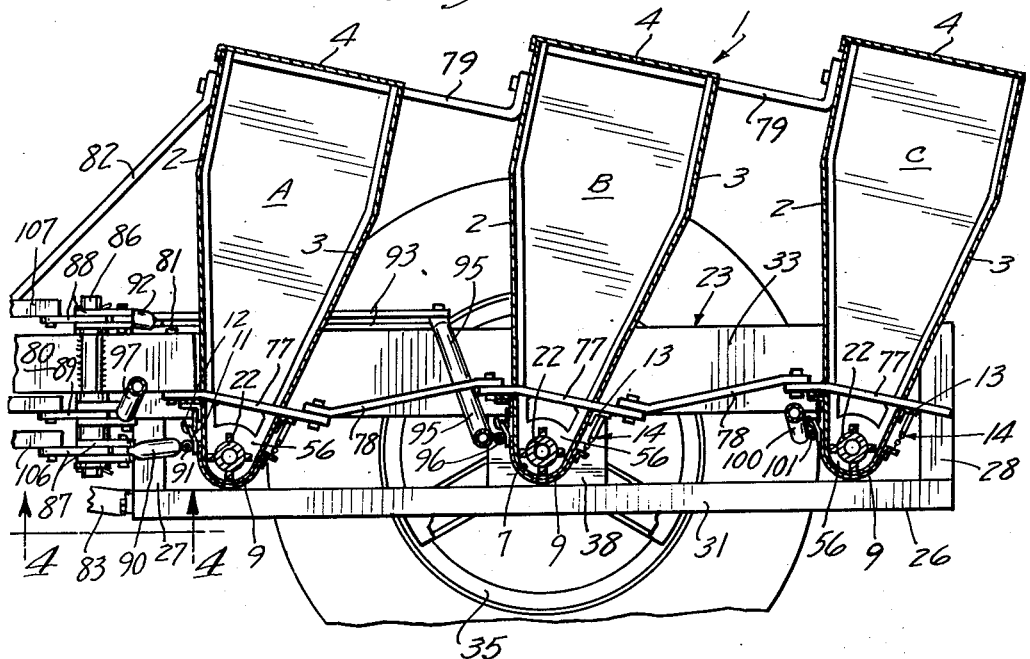
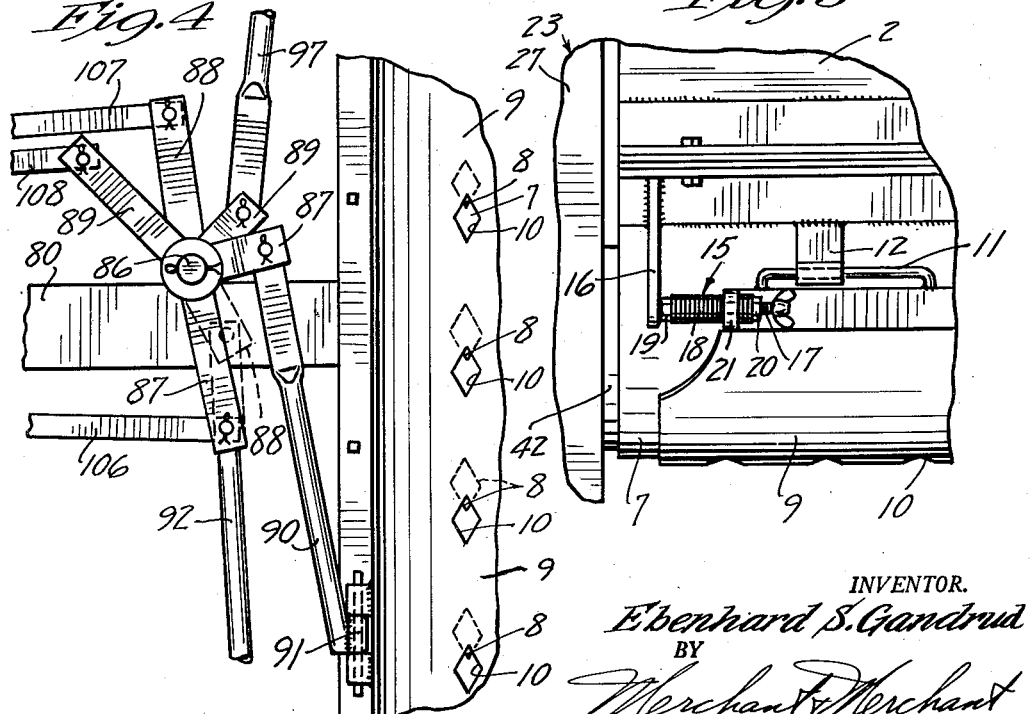

United States Patent Office 2,759,637
Patented Aug. 21, 1956

2,759,637

APPARATUS FOR DISTRIBUTING GRANULAR MATERIAL

Ebenhard S. Gandrud, Owatonna, Minn.

Application June 23, 1954, Serial No. 438,813

14 Claims. (Cl. 222—135)

My invention relates to the art of spreading fertilizer, seeds, and the like over a field, and more particularly to a novel method and apparatus for distributing granular material over a field to be treated.

It is well known among those skilled in the art that farms crops, like other vegetation, receive food for growth from the soil, and that this food must be replenished periodically if the soil is to properly support plant life and growth. For this reason it is customary to add to the soil certain commercially produced chemical salts, in granular form, that will release plant nutrients such as nitrogen, phosphorus and potash.

Inasmuch as different soil conditions and different crops require such nutrients in different proportions to each other, it is customary to determine the particular requirement of the soil before supplying the chemical salts or fertilizers otherwise indiscriminately thereto, whereby to prevent waste of material and unnecessary expense. Heretofore, it has been the practice to spread or distribute the selected salts separately over the field in their correct proportions, or to mix the salts before spreading in the required proportions, place the aggregate thus produced in a spreading device and distribute the same during one passage over the field. Obviously, this latter method saves time over the former, which would require traversing the field as many times as there are salts to be applied to the soil.

However, the above described latter method has a distinct disadvantage not found in the former method. Each of the various types of granular chemical salts has a different specific gravity than the others thereof. Hence, when the mixed aggregate is placed in the dispensing hopper of a distributing machine and the same is moved over the relatively rough terrain of a field, the resultant jogging of the machine will cause the several types of salts to gravitate to different levels in the hopper and unequal distribution of the various salts will ensue. In other words, one portion of the field will receive mostly one type of food producing material, while another portion of the field will receive a different type.

The primary object of my invention is the provision of a machine which will distribute a plurality of types of granular nutrient-producing materials or fertilizers over a field in the desired amounts relative to each other during a single passage of the machine over a given field area.

Another object of my invention is the provision of a machine which will distribute a predetermined total quantity of the above-mentioned granular materials in their correct proportions for a given area to be treated and during a single passage of the machine over the area.

A still further object of my invention is the provision of a novel method of spreading granular material over an area to be treated.

Still another object of my invention is the provision of a spreading device as set forth having a plurality of material dispensing hoppers from each of which the feeding or discharge rate may be independently controlled.

Still another object of my invention is the provision of novel means for supporting a plurality of hoppers for traveling movements over the field.

Another object of my invention is the provision of a wheel-supported mounting frame for carrying a plurality of dispensing hoppers having feeding rotors therein, and of novel driving means whereby the several feeding rotors are driven from the supporting wheels.

Still another object of my invention is the provision of novel means whereby the several feeding rotors may be quickly and easily removed from their respective hoppers for cleaning, servicing, and the like.

Still another object of my invention is the provision of a distributing machine as set forth which is relatively simple and inexpensive to manufacture, which is highly accurate and efficient in operation, and which is rugged in construction and durable in use.

The above and still further highly important objects and advantages of my invention will become apparent from the following detailed specification, appended claims and attached drawings.

Referring to the drawings, which illustrate the invention, and in which like characters indicate like parts throughout the several views:

Fig. 1 is a view in top plan of a spreading device built in accordance with my invention;

Fig. 2 is a view in side elevation of the machine of Fig. 1;

Fig. 3 is an enlarged fragmentary transverse section taken substantially on the line 3—3 of Fig. 1;

Fig. 4 is a still further enlarged fragmentary view in bottom plan as seen from the line 4—4 of Fig. 3;

Fig. 5 is an enlarged fragmentary view in front elevation of one of the dispensing hoppers of my invention;

Fig. 6 is an enlarged fragmentary view corresponding to a portion of Fig. 1, some parts being broken away and some parts shown in section;

Fig. 7 is a fragmentary view partly in vertical section, and partly in end elevation as seen from the line 7—7 of Fig. 6, some parts being broken away and some parts shown in section; and Fig. 8 is an enlarged fragmentary section taken substantially on the line 8—8 of Fig. 2.

In the preferred embodiment of the invention illustrated, the numeral 1 indicates in its entirety a spreading device comprising front, intermediate and rear hoppers A, B and C respectively, disposed in spaced parallel relationship. Each of the hoppers involves front and rear walls 2 and 3 respectively, and has its open upper end normally closed by a cover element 4 that is hinged to opposite end wall members 5 as indicated at 6. The front and rear walls 2 and 3 of each of the hoppers A, B and C are connected by arcuate bottom members 7, each of which is provided with a plurality of discharge openings 8. The hoppers A, B and C are further each provided with cross sectionally arcuate valve-acting gate plates 9 that are concentric with and mounted for longitudinal sliding movements relative to the arcuate bottom portions 7. The gate plates 9 are each formed with a plurality of openings 10 which are each registrable with a different one of the discharge openings 8 in their respective bottom portions 7 under sliding movements of the gates 9 in one direction. With reference to Fig. 4 it will be seen that the openings 8 and 10 are preferably of diamond shape. The gate plates 9 may be moved to a greater or lesser degree to vary the degree of registration between each opening 10 and its corresponding opening 8 in the bottom portion 7, whereby to vary the rate of discharge of material from each of the hoppers. The gate plates 9 are each provided with longitudinally extended loops 11 that are engageable with hooks 12 on the front walls 2, see Figs. 3 and 5. The rear edges of the gate plates 9 are secured to brace members 13 by means of releasable flexible connections 14. These flexible connections 14 are similar to those shown and described in my prior United States Patent 2,350,107 of date May 30, 1944.

Means for limiting sliding movements of the several gate plates 9 includes a plurality of gauging devices 15, one mounted on each gate plate 9 and each engaging a stop lug or the like 16 mounted on its respective hopper under sliding movements of its respective gate plate 9 in a direction to cause registry of said openings. Each gauging element comprises a bolt 17 having a plurality of washers 18 mounted thereon between the stop lug engaging head 19 of the bolt and a nut 20 screw threaded on the opposite end portion thereof. As shown in Fig. 5, the bolt 17 is mounted on a lug 21 welded or otherwise rigidly secured to the gate plate 9. The construction and operation of the gauging device 15 together with the means for mounting the same on the gate plate is fully shown and described in my prior United States Patent 2,630,945 of date March 10, 1953. Obviously, the number of washers 18 on the bolt 17 between the head 19 and the lug 21 determines the degree of registration between the discharge openings 8 and their cooperating openings 10 when the gate plate 9 is moved in an operative discharge direction. Of course movement of the gate plate 9 in the opposite direction will cause the openings 10 to be moved entirely away from lapping engagement with the discharge openings 8 whereby to completely shut off any discharge of material from the hoppers A, B or C.

Each of the hoppers A, B and C contains an elongated agitator or feeding rotor 22 for the purpose of insuring uniform discharge of the materials within the several hoppers. The agitators 22 are mounted in the bottoms of their respective hoppers in closely spaced overlying relationship to the discharge apertures 8 thereof. The agitators 22 may be of any suitable variety, but are preferably of the type shown in my prior patents above identified.

A pair of end frames 23 and 24 are disposed one on each end of the hoppers, and are identical except that one is righthand and the other is lefthand. Each of the end frames 23 and 24 comprises upper and lower elongated channel members 25 and 26 respectively and relatively short front and rear frame members 27 and 28 respectively. The upper and lower channel members and the end frame members are welded or otherwise anchored together to provide a rigid generally rectangular frame. The upper channel member 25 of each end frame includes inner and outer depending flanges 29 and 30 respectively, whereas the lower channel member of each end frame includes upstanding inner and outer flanges 31 and 32 respectively. Welded or otherwise rigidly secured to the depending inner flange 29 of each end frame is a flange extension element 33 of substantially the same length as the upper channel member 25. As shown in Figs. 7 and 8, the several hoppers A, B and C are anchored to the end frames 23 and 24 by means of bolts or the like 34 which extend through the inner flanges 29 and flange extensions 33 and which are screw threaded into the end wall members 5 of the hoppers. As shown the intermediate hopper B is anchored to substantially the central portion of the end frames 23 and 24 whereas the front and rear hoppers A and C respectively are anchored to opposite end portions of the end frames 23 and 24 substantially equidistantly from the intermediate hopper A.

For supporting the several hoppers and end frames in spaced relation to the ground, I provide a pair of pneumatic tire-equipped ground-engaging wheels 35 having tubular hubs 36 that are journalled for rotation on tubular trunnions 37, one of which is shown, see Fig. 8.

The trunnions 37 are integrally formed with mounting plates 38 that are rigidly secured at their top and bottom portions to the outer flanges 30 and 32 of the upper and lower channel members 25 and 26 respectively by means of nut-equipped bolts or the like 39. At their inner ends, the hubs 36 are provided with flanges 40 that are engaged by split retaining plates 41 which are bolted or otherwise removably secured to the trunnion mounting plates 38. The retaining plates 41 permit free rotary movement of the wheels 35 but retain said wheels against axially outward movement with respect to their respective end frames 23 and 24. Engagement of the inner ends of the hubs 36 with the trunnion mounting plates 38 prevents axially inward movement of the wheels 35.

At its opposite ends, the intermediate hopper B is provided with a pair of bearings 42, one of which is shown, anchored to the end walls 5 by means of a set screw or the like 43, see Fig. 8. The bearings 42 are axially aligned with the trunnions 37, each journalling one of a pair of stub shafts 44, the outer end portions of which extend through the trunnions 37, and the inner ends of which extend into the interior of the hopper B. The extreme inner ends of the stub shafts 44 are provided with axially outwardly opening transverse notches 45 which receive cooperating pins 46 which extend diametrically through the hollow interior 47 of the feeding rotor 22 in the hopper B. With further reference to Fig. 8 it will be seen that the hub 36 shown therein extends axially outwardly beyond the tubular trunnion 37, and that the outer end portion of the stub shaft 44 is provided with a pair of axially spaced annular flanges 48 which define a groove 49. Mounted for radial movements in the outer end portion of the hub 36 is a pin 50 which is yieldingly biased radially inwardly with respect to the hub 36 by a coil compression spring 51 interposed between a mounting bracket 52 for the pin 50 and a thrust washer 53 on the pin. A lever 54 is pivotally secured to the bracket 52 and to the outer end of the pin 50, and may be manipulated to withdraw the pin 50 from the annular groove or channel 49 whereby to permit axially outward movement of the stub shaft 44 away from driving engagement of its inner end with its cooperating feeding rotor 22. A radially outwardly opening recess 55 in the channel 49 is adapted to receive the inner end of the pin 50 whereby to lock the stub shaft 44 to the wheel 35 for common driving rotation therewith when the inner end of the shaft 44 is operatively coupled to the feeding rotor 22 in the hopper B. It may be assumed that the foregoing stub shaft construction is found on the opposite end of the hopper B in connection with the wheel 35 adjacent the end frame 23. It may also be assumed that each of the agitators 22 is formed in two identical axially aligned parts each part being driven by an opposite stub shaft. The inner adjacent ends of the agitator halves may be assumed to be journalled in center bearings 56 in the bottom portions of the hoppers A, B and C. This structure is shown in both of my prior patents above-identified, the reasons for said two-piece agitator structure being fully set forth therein. It should be noted that, when the pin 50 is withdrawn radially outwardly from the groove or channel 49, the stub shaft 44 may be withdrawn from engagement with its cooperating agitator 22, whereupon the agitator 22 may be lifted from the hopper B for easy cleaning or servicing of both the agitator and the hopper.

The hopper A is provided with a pair of stub shafts 57 which are journalled in bearings 58 at opposite ends of the hopper A. Likewise, the rear hopper C is provided with end bearings 59 which journal stub shafts 60 which, like the stub shafts 57, project longitudinally outwardly from the hoppers and between the upper and lower channel members 25 and 26 of the end frames 23 and 24. The stub shafts 57 and 60, only one of which is shown, are similar in structure to the stub shafts 44, and may be assumed to have driving engagement with their respective agitators or feed rotors 22 by pin and slot or groove connections identical to the groove 45 and pin 46 in the stub shaft and agitator construction above-described in connection with the intermediate hopper B. With reference particularly to Figs. 2 and 6 it will be seen that the axes of the stub shafts 57 and 60 and their respective agitators 22 lie radially outwardly of the circumference of the wheels 35. This construction permits withdrawal of the stub shafts 57 and 60 from their respective bearings 58 and 59 without necessitating removal of either of the wheels 35 from their trunnions 37. Means for releasably locking the stub shafts 57 against axially outward movement comprises anchoring bars 61 depending from the outer flanges 30 of the upper frame channels 25 and releasably secured thereto by wing nut-equipped studs 62, see particularly Figs. 6 and 7. Normally, the lower end portions of the bars 61 lie against the outer ends of the shafts 57. Loosening of the wing nuts associated with the studs 62 permits swinging of the bars 61 out of alignment with the ends of the stub shafts 57 to permit withdrawal thereof from the bearings 58. With further reference to Fig. 6 it will be seen that the stub shafts 60 are somewhat shorter than the shafts 57 and that said stub shafts 60 are releasably locked against axially outward movement by anchoring bars 63 depending from the outer flanges 30 of the upper channels 25 and secured thereto by wing nut-equipped studs 64. The lower end portions of the anchoring bars 63 are offset axially inwardly with respect to the stub shafts 60 as indicated at 65, the offset portions 65 engaging the outer ends of the shafts 60.

Journalled on the stub shafts 44 are sprockets 66 each having a pair of spaced sets of sprocket teeth 67 and 68. The axially outer ends of the sprockets 66 are formed to provide axially outwardly opening diametrically extended notches or grooves 69 which are adapted to receive radially outwardly projected portions of drive pins 70 that extend transversely through the stub shafts 44, when the stub shafts 44 are in driving engagement with the drive pins 46 of their respective feeding rotors 22. As shown in Fig. 8, the inner ends of the sprockets 66 abut the outer ends of the adjacent bearings 42. Similarly journalled on the stub shafts 57 and 60 are sprocket wheels 71 and 72 respectively each having grooves 73 in their outer ends, said grooves being similar to the grooves 69 in the sprockets 66. Drive pins 74 extend transversely through the stub shafts 57 and 60 and are received in the notches or grooves 73 whereby to transfer rotary movement of the sprockets 71 and 72 to their respective stub shafts 57 and 60. An endless link chain 75 runs over the sprocket teeth 67 of the sprocket 66 and the sprocket wheel 71, and a second endless link chain 76 runs over the sprocket teeth 68 of the sprocket 66 and the sprocket wheel 72. With this arrangement, rotation of the wheels 35 causes rotary movement to be imparted to all of the feeding rotors 22 when the pins 50 on the wheel hubs 36 are received within the recesses 55 in the stub shafts 44. It will be understood that the above-mentioned driving arrangement is found within both end frames 23 and 24 whereby the agitators are driven from both wheels 35. As clearly shown in Figs. 6 and 8, the drive chains and sprockets are contained within the end frames so as to be protected to some extent against undue clogging by foreign matter such as dirt and vegetation. Furthermore, when any of the stub shafts are withdrawn from the bearings of their respective hoppers, the sprocket wheels and chains connected thereto are protected against falling to the earth and becoming choked or clogged therewith.

Extending through the intermediate portion of each of the hoppers A, B and C are central hopper frame members 77. The front and rear ends respectively of the members 77 are disposed laterally outwardly of the front and rear walls 2 and 3 respectively of each hopper, the projected rear end of the members 77 of the hopper A being connected to the forwardly projecting end of the member 77 associated with the hopper B by means of a relatively heavy connector bar or link 78. A second link 78 is bolted or otherwise rigidly connected at its opposite ends to the rearwardly projecting portion of the member 77 of the hopper B and the forwardly projecting portion of the member 77 of the hopper C. The upper end portions of the hoppers A and B, intermediate their ends, are further connected by a rigid connecting bar 79 and a second identical connecting bar 79 connects the top portions of the hoppers B and C, see Figs. 1–3. A drawbar 80 extends forwardly from the central portion of the hopper A and is secured to the forwardly projecting portion of the member 77 associated with the hopper A by means of a nut-equipped bolt or the like 81. A rearwardly inclined brace member 82 is connected at its opposite ends to the drawbar 80 and to the front wall 2 of the hopper A. A pair of diagonal brace members 83 are rigidly secured at their front ends to the intermediate portion of the drawbar 80 and at their rear ends one each to the front end portions of the end frames 23 and 24. By means of the above, the hoppers are rigidly secured together and, when the front end of the drawbar 80 is coupled to a mounting fixture 84 of a tractor, not shown, by means of a coupling pin or the like 85, pulling strain is applied equally to the central portion of the hoppers A, B and C and to the end frames 23 and 24, thus imposing no appreciable strain on any single portion of the machine 1 when the same is being drawn through a field.

For the purpose of independently controlling the feeding of material from each of the three hoppers A, B and C from the operator's seat on the tractor, I provide control mechanism comprising a fixed shaft 86 welded or otherwise secured to one side of the drawbar 80 at its rear end portion just forwardly of its connection to the hopper A, a plurality of bell crank levers 87, 88 and 89, which are pivotally mounted at their intermediate portions on the shaft 86, mechanism for operating said bell cranks and linkage connecting each of the bell cranks to the gate plate of a different one of the hoppers A, B and C. A rigid pushrod 90 is connected at one end to one end of the bell crank lever 87 and at its other end to the gate plate 9 of the hopper A as indicated at 91. A second pushrod is connected at one end to one end of the bell crank 88, and at its other end to one end of a lever 93 which is pivotally secured intermediate its ends to the upper channel member 25 of the end frame 23, as indicated at 94. The opposite end of the lever 93 is connected to one end of a rigid link 95 which is connected at its other end to the gate plate 9 of the hopper B, as indicated at 96. In like manner, one end of the bell crank lever 89 is pivotally secured to one end of a pushrod 97 which is pivotally connected at its other end to one end of a lever 98 that is pivotally connected intermediate its ends to the upper channel member 25 of the end frame 24, as indicated at 99. The opposite end of the lever 99 is pivotally connected to one end of a rigid link 100, the other end of which is secured to the gate plate 9 of the rear hopper C as indicated at 101, see Fig. 3. It will be noted that the levers 93 and 98 are bifurcated and that the ends of the pushrods and links operatively associated therewith are interposed between the bifurcated ends thereof.

The mechanism for operating the bell cranks 87, 88 and 89 includes a plurality of handle levers 102, 103 and 104 extending upwardly from and pivotally connected to the front end portion of the drawbar 80 as indicated at 105. A rigid link 106 extending generally longitudinally of the drawbar 80, has one end pivotally connected to one end of the bell crank 87 and its other end pivotally connected to the intermediate portion of the handle lever 102. A second rigid link 107 extends generally in the direction of the drawbar 80 and has its rear end pivotally connected to one end of the bell crank 88 and its front end pivotally connected to the intermediate portion of the handle lever 103. In like manner, a similar rigid link 108 has its rear end pivotally secured to one end of the bell crank 89 and its front end pivotally secured to the intermediate portion of the handle lever 104. The handle levers 102, 103 and 104 are disposed within reaching distance of the tractor operator when seated on the tractor and are movable in generally forward and rearward directions to impart opening and closing movements to the several gate plates 9 each independently of the other thereof. It will be noted that the rearward tilting of the several hoppers A, B and C causes the greater part of the load exerted on the supporting wheels 35 to be disposed rearwardly of the axis of the wheels 35. However, this rearward disposition of the weight is offset by the weight of the drawbar 80, the brace members 83 and the linkage carried by the drawbar, whereby the center of gravity of the loaded machine is disposed substantially in the vertical plane of the wheel axis very slightly forwardly thereof. Thus, the machine is substantially in balance, and no great effort is necessary to raise the front end of the drawbar 80 when it is desired to attach the same to a tractor.

In use, hoppers A, B and C are each loaded with a different granular chemical salt, each of which is adapted to release a different chemical element or food to the vegetation when the salts are applied to the ground. The metering or gauging devices 15 for each hopper A, B and C are adjusted to permit feeding of each granular ingredient or substance in the desired proportion with respect to the others of said substances and to the soil requirements. Of course, before the hoppers are filled, the gate plates 9 are moved to their closed positions by their respective handle levers 102, 103 and 104. After the hoppers A, B and C have been filled with the desired granular substances at the edge of the field to be treated, the machine is drawn onto the field by the tractor, not shown, or by other suitable means, the handle levers 102, 103 and 104 being manipulated to open the gate plates 9 to the extent permitted by the metering devices 15. Thus, as the machine traverses the field, the several granular chemical substances are applied to the field in highly uniform and accurate proportions.

From the above it will be seen that the use of my novel machine above-described has developed a novel method of treating the soil with plant nutrients or fertilizer, namely, the simultaneous discharging of granular chemical substances from three receptacles, and individually controlling the rate of feed of each substance per given area traversed to provide a predetermined total aggregate delivery to a given surface area, each of said substances representing a different predetermined proportion of the aggregate. The use of this method insures a uniform distribution and results in saving of considerable time and effort in the treatment of soils.

While I have shown and described a preferred method of treating soil and a preferred structure for carrying out the method, it will be understood that the same are capable of modification without departure from the spirit and scope of the invention as defined in the claims.

What I claim is:
1. In a machine for spreading granular materials, elongated front, intermediate and rear dispensing hoppers, an elongated rotary agitator in the bottom portion of each of said hoppers and extending longitudinally thereof, means mounting said hoppers in spaced parallel relationship, said means including a pair of ground-engaging supporting wheels journalled for rotation longitudinally outwardly of the opposite ends of said intermediate hopper, the axes of the agitators in said front and rear hoppers being disposed radially outwardly of the circumference of said ground wheels, stub shafts journalled in one end of each of said hoppers and movable axially with respect thereto, means on the inner ends of said stub shafts and the adjacent ends of said agitators coupling said stub shafts to their respective agitators for common driving rotation upon axially inward movement of said stub shafts toward their respective agitators, means coupling the stub shaft of the intermediate hopper to said wheels for common rotation therewith, and chain and sprocket connections between the stub shaft of said intermediate hopper and the shafts of said front and rear hoppers for imparting driving rotation to the stub shafts of said front and rear hoppers, axially outward movement of said stub shafts causing disengagement therebetween and their respective agitators.

2. The structure defined in claim 1 in further combination with means for releasably locking said stub shafts against axial movement away from driving engagement with their respective agitators.

3. The structure defined in claim 1 in further combination with tubular trunnions journalling said wheels, the stub shaft of the intermediate hopper extending axially through one of said trunnions.

4. The structure defined in claim 1 in which said hopper mounting means further includes a pair of elongated generally rectangular end frames in laterally spaced parallel relationship, one at each end of said hoppers and rigidly secured thereto, said wheels being mounted on aligned trunnions anchored to said end frames.

5. The structure defined in claim 4 in which each of said end frames comprises elongated upper and lower opposed channel members and relatively short front and rear frame members connecting said channel members, said chain and sprocket connections being disposed between said channel members.

6. The structure defined in claim 5 in further combination with means for releasably locking the stub shafts of said front and rear hoppers against axial movement away from driving engagement with their respective agitators, said means comprising anchoring bars releaseably tators, sai dmeans comprising anchoring bars releaseably the outer ends of their respective stub shafts.

7. The structure defined in claim 1 in which each of said hoppers is provided with discharge openings in its bottom portion and independent valve means controlling discharge of material through said openings, and in further combination with a drawbar extending forwardly from said hoppers and operating mechanism for said valve means, said operating mechanism comprising, a shaft on said drawbar adjacent its rear end, a plurality of levers mounted for swinging movements on said shaft, linkage connecting each of said levers to the valve means of a different one of said hoppers, and means adjacent the front end of the drawbar for moving each of said levers independently of the others thereof.

8. In a machine for spreading granular materials, elongated front, intermediate and rear dispensing hoppers, an elongated rotary agitator in the bottom portion of each of said hoppers and extending longitudinally thereof, means mounting said hoppers in spaced parallel relationship, said means including a pair of ground-engaging supporting wheels journalled for rotation longitudinally outwardly of the opposite ends of said intermediate hopper, axially movable stub shafts journalled one each in one end of each of said hoppers, means on the inner ends of said stub shafts and the adjacent ends of said agitators coupling said stub shafts to their respective agitators for common driving rotation upon axially inward movement of the stub shafts, means for coupling said stub shafts to one of said wheels for common rotation therewith, a drawbar extending forwardly from said front hopper, each of said hoppers having discharge openings in its bottom and a valve controlling the discharge of material through said openings, and independent valve operating means for each valve, said valve operating means comprising a shaft on said drawbar adjacent its rear end, a plurality of levers mounted for swinging movements on said shaft, linkage connecting each of said levers to the valve of a different one of said hoppers, and means adjacent the front end of said drawbar for moving each of said levers independently of the others thereof.

9. The structure defined in claim 8 in which said means adjacent the front end of the drawbar comprises a plurality of handle levers pivotally secured to said drawbar and rigid links connecting each of said handle levers to a different one of the levers on said shaft.

10. The structure defined in claim 8 in which said hopper mounting means further includes a pair of elongated generally rectangular end frames each comprising upper and lower opposed channel members and relatively short front and rear frame members connecting said channel members at their ends, said hoppers being anchored to the inner flanges of said upper channel members, and in further combination with aligned tubular trunnions anchored to the outer flanges of said channel members, said wheels being journalled on said tubular trunnions, and diagonal brace members each anchored at one end to the front end of one of said end frames and at its other end to the intermediate portion of said drawbar.

11. The structure defined in claim 10 in which the stub shaft of the intermediate hopper extends axially through one of said trunnions, and in which the means for coupling said stub shafts to one of the wheels for common rotation therewith includes a pair of sprocket wheels mounted on the stub shaft of said intermediate hopper for axial sliding movements with respect thereto and for common rotation therewith, a pair of other sprocket wheels one each mounted on one of the stub shafts of said front and rear hoppers for axial sliding movements with respect thereto and for common rotation therewith, each of said last-mentioned pair of sprocket wheels being operatively aligned with a different one of the sprocket wheels on the intermediate stub shaft, and endless link chains running over said operatively aligned sprocket wheels, the stub shaft of said intermediate hopper being releasably coupled to the adjacent wheel.

12. The structure defined in claim 11 in further combination with means for releasably locking said stub shafts of said front and rear hoppers against axial movement away from driving engagement with their respective agitators, said means comprising anchoring bars mounted on one of said end frames for swinging movements in planes transversely of said stub shafts and into and out of engagement with the outer end of an adjacent stub shaft and providing stop elements therefor.

13. The structure defined in claim 8 in which said hoppers each include a generally horizontally disposed central member extending forwardly and rearwardly of the front and rear walls thereof and in further combination with rigid links anchored at their opposite ends to the adjacent projected ends of said central members, said drawbar being anchored at its rear end to the forwardly projected end of the central member of the front hopper.

14. In a machine for spreading granular materials, elongated front, intermediate and rear dispensing hoppers, elongated rotary agitators in the bottom portions of said hoppers, means including a pair of ground-engaging supporting wheels mounting said hoppers in spaced parallel relationship for movement over the ground, the axes of the agitators in said front and rear hoppers being disposed radially outwardly of the circumference of said ground wheels, stub shafts journalled in one end of each of said hoppers and movable axially with respect thereto, means on the inner ends of said stub shafts and the adjacent ends of said agitators coupling said stub shafts to their respective agitators, means coupling the stub shaft of the intermediate hopper to one of said wheels for rotation therewith, and power transmission mechanism between the stub shaft of the intermediate hopper and the shafts of said front and rear hoppers for imparting driving rotation to the stub shafts of said front and rear hoppers, axially outward movement of said stub shafts causing disengagement therebetween and their respective agitators.

References Cited in the file of this patent

UNITED STATES PATENTS

| | | |
|---|---|---|
| 1,282,139 | Targosky | Oct. 22, 1918 |
| 2,563,165 | Gandrud | Aug. 7, 1951 |